(12) United States Patent
Clode et al.

(10) Patent No.: US 9,727,861 B1
(45) Date of Patent: Aug. 8, 2017

(54) MULTIPLE RATE CURRENCY CONSOLIDATOR

(71) Applicant: NetSuite Inc., San Mateo, CA (US)

(72) Inventors: Stephen Clode, San Jose, CA (US);
Gaurav Bawa, Sunnvale, CA (US);
Darren Linscott, San Jose, CA (US);
William Ellery Bailey, Palo Alto, CA (US)

(73) Assignee: NetSuite Inc., San Mateo, CA (US)

( * ) Notice: Subject to any disclaimer, the term of this patent is extended or adjusted under 35 U.S.C. 154(b) by 408 days.

(21) Appl. No.: 14/093,743

(22) Filed: Dec. 2, 2013

Related U.S. Application Data (63) Continuation of application No. 13/537,587, filed on Jun. 29, 2012, now Pat. No. 8,622,290, which is a continuation of application No. 12/428,297, filed on Apr. 22, 2009, now Pat. No. 8,210,425.

(60) Provisional application No. 61/048,108, filed on Apr. 25, 2008.

(51) Int. Cl.
*G06Q 40/00* (2012.01)
*G06Q 20/38* (2012.01)

(52) U.S. Cl.
CPC .................. *G06Q 20/381* (2013.01)

(58) Field of Classification Search
CPC ........ G06Q 40/00; G06Q 40/02; G06Q 40/04; G06Q 40/06; G06Q 40/12
USPC .............. 705/30, 36 T, 37–39; 235/375, 379
See application file for complete search history.

(56) References Cited

U.S. PATENT DOCUMENTS

| | | | |
|---|---|---|---|
| 4,251,867 A * | 2/1981 | Uchida | G06Q 20/10 705/39 |
| 4,989,141 A | 1/1991 | Lyons et al. | |
| 5,189,608 A | 2/1993 | Lyons et al. | |
| 5,943,655 A * | 8/1999 | Jacobson | G07G 1/12 705/30 |
| 6,829,590 B1 | 12/2004 | Greener et al. | |
| 7,047,218 B1 | 5/2006 | Wallman | |
| 7,110,983 B2 | 9/2006 | Shear et al. | |
| 7,140,538 B2 * | 11/2006 | Lee | G06Q 20/04 235/375 |
| 7,177,834 B1 | 2/2007 | Maestle | |
| 7,249,092 B2 * | 7/2007 | Dunn | G06Q 20/04 235/379 |
| 7,310,615 B2 | 12/2007 | Lewis | |
| 7,392,212 B2 | 6/2008 | Hancock et al. | |
| 7,506,006 B2 | 3/2009 | Vadlamani et al. | |

(Continued)

*Primary Examiner* — Andrew Joseph Rudy
(74) *Attorney, Agent, or Firm* — Lane Powell PC (57) ABSTRACT

A multiple currency rate consolidator addresses the needs of multi-national companies that do business in different currencies and tax localities. A consolidated view of financial data may be provided in real time. The multiple currency rate consolidator allows each subsidiary within a subsidiary hierarchy to enter and manage transactional data as well as budget/forecast data in a corresponding localized functional currency. The multiple currency rate consolidator allows different consolidation levels to view localized, consolidated values of subsidiary transactions. The multiple currency rate consolidator also accommodates statutory, ad hoc and management reporting consolidation using different subsidiary configurations for the same time periods, as well as the versioning of the subsidiary hierarchy to accommodate structural changes across different time periods.

20 Claims, 5 Drawing Sheets

(56) References Cited

U.S. PATENT DOCUMENTS

| | | |
|---|---|---|
| 7,756,896 B1 | 7/2010 | Feingold |
| 7,844,538 B2 | 11/2010 | Wallman |
| 7,899,742 B2 * | 3/2011 | Benkert ................ G06Q 20/04 |
| | | 705/39 |
| 7,974,903 B2 * | 7/2011 | Ziegler ................ G06Q 40/02 |
| | | 705/36 T |
| 8,024,242 B2 | 9/2011 | Galit |
| 8,055,582 B2 | 11/2011 | Digrigoli et al. |
| 8,073,904 B2 | 12/2011 | Lunenfeld |
| 8,090,698 B2 | 1/2012 | Billingsley et al. |
| 8,340,726 B1 * | 12/2012 | Fujisaki ................ H04M 19/04 |
| | | 345/168 |
| 8,645,228 B2 * | 2/2014 | Moussa ................ G06Q 10/08 |
| | | 705/26.81 |
| 8,671,064 B2 * | 3/2014 | Schmitt ................ G06Q 10/08 |
| | | 705/330 |
| 2003/0163398 A1 | 8/2003 | Yoshioka et al. |
| 2005/0144114 A1 | 6/2005 | Ruggieri et al. |

* cited by examiner

MULTIPLE RATE CURRENCY CONSOLIDATOR

CROSS-REFERENCE TO RELATED APPLICATIONS

This application is a continuation of U.S. patent application Ser. No. 13/537,587, filed Jun. 29, 2012 (now issued U.S. Pat. No. 8,622,290), which is a continuation of U.S. patent application Ser. No. 12/428,297, filed Apr. 22, 2009 (now issued U.S. Pat. No. 8,210,425), which is a non-provisional filing of U.S. Provisional Application No. 61/048,108, filed Apr. 25, 2008, the complete disclosures of which are incorporated herein by reference for all purposes.

TECHNICAL FIELD

The present invention relates to multiple rate currency consolidation and, more particularly, to the consolidation of multiple rate currencies in real time.

BACKGROUND

Consolidation is the process that transforms individual financial statements for a group of entities into a single financial statement. In the United States, this process creates a consolidated financial statement that is based on U.S. Generally Accepted Accounting Principles (GAAP), the standard that applies to external, or statutory, financial reporting. To create a consolidated financial report, companies that own all or part of other companies create financial reports to meet both internal and external reporting requirements.

In accordance with Financial Accounting Standards Board (FASB) Statement No. 52, if a foreign entity's financial records are not maintained in the functional currency of a parent company, then the financial records must be translated. For example, a U.S. parent company may have a fully-owned foreign subsidiary located in the United Kingdom. The British subsidiary may have a subsidiary in Germany. The German entity's financial records are maintained in euros (€), their functional currency, such that all transactions ultimately have to balance out and be reported legally in euros. However, the functional currencies of British subsidiary and the U.S. parent company are British pounds (£) and U.S. dollars (USD), respectively. Thus, the German branch's financial records kept in euros must be translated into British pounds because the British subsidiary is the immediate parent of the German subsidiary. The value of the German financial are then translated from British pounds to U.S. dollars, which is the presentation currency of the financials at the U.S. parent company level.

This is typically accomplished by exporting summarized financial data from different subsidiaries into an external tool such as a spread sheet application (e.g., Microsoft Excel) or financial analysis and reporting software (e.g., Microsoft FRx). In external consolidation, which typically occurs at the end of the month, financial data from different entities is entered and accounting rules are applied outside of the system to convert to other currencies based on the appropriate exchange rates. This is done for all of the different subsidiaries resulting in a consolidated set of financial data. However, such externally consolidated financial data cannot be performed "on-the-fly" or accessed in real time by higher level entities in the corporate structure. This can be a disadvantage as the ability to produce real-time or pseudo real-time consolidated financial data provides decision makers with the most current information regarding the operations of subsidiaries.

Therefore, what is needed is a system and method for consolidating multiple rate currencies in real time to produce current financial information for subsidiaries of a parent company that may be used to evaluate the operation of a company and its related organizations.

SUMMARY

Embodiments of the present invention are directed to a multiple currency rate consolidator that addresses the needs of multi-national companies that do business in different currencies and tax localities. Using the inventive system and method, a consolidated view of financial data may be provided in real time. In accordance with embodiments of the present invention, the multiple currency rate consolidator allows each subsidiary within a subsidiary hierarchy to enter and manage transactional data as well as budget/forecast data in a corresponding localized functional currency. The multiple currency rate consolidator allows different consolidation levels (i.e., the parent company or parent company subsidiaries) to view localized, consolidated values of subsidiary transactions. The multiple currency rate consolidator also accommodates statutory, ad hoc and management reporting consolidation using different subsidiary configurations for the same time periods, as well as versioning of the subsidiary hierarchy to accommodate structural changes across different time periods.

The multiple currency rate consolidator in accordance with embodiments of the present invention provides, among others, the following features: 1) live consolidated multi-currency, multi-subsidiary financial data updated in real-time; 2) unlimited drill-down from summary data into subsidiary detail with full foreign currency translation; 3) flexibility for representation of diverse subsidiary structures including regional consolidations and elimination entries; 4) support for multiple different subsidiaries and currencies; 5) FASB-52 compliant financial records with support for average, ending and historical consolidation rates; 6) support for multiple subsidiary hierarchies and different exchange rate configurations over the same time period to accommodate ad hoc reporting, management reporting and purely statutory consolidation reporting views; 7) support for different subsidiary hierarchies across different time periods, such that organizational changes (i.e., inclusion or removal of subsidiaries) do not affect the consolidated view of prior periods; and 8) support for average, ending and historic budget rates.

In some embodiments, the present invention is directed to a computer-implemented method for consolidating multiple rate currencies associated with different corporate subsidiaries. A request for consolidated financial data is received at a user interface from a requesting subsidiary. The request indicates a perspective point of the requesting subsidiary relative to the other different corporate subsidiaries. A data structure representing a subsidiary hierarchy indicating a relationship between the different corporate subsidiaries is traversed. Each subsidiary in the subsidiary hierarchy comprises financial data in a functional currency. The requesting subsidiary is positioned higher in the subsidiary hierarchy than at least one other subsidiary. In response to the request, an exchange rate between at least two related subsidiaries in the subsidiary hierarchy is accessed from a data store. At least one of the related subsidiaries is the requesting subsidiary and the remainder of the related subsidiaries is positioned below the requesting subsidiary in the subsidiary hierarchy. The financial data of each subsidiary in the subsidiary hierarchy is converted to the functional currency of a related subsidiary positioned higher in the subsidiary hierarchy based on the corresponding exchange rate. The requested consolidated transaction data is calculated based on the converted financial data for each subsidiary in the subsidiary hierarchy related to and positioned lower than the requesting subsidiary. The consolidated financial data is then calculated in the functional currency associated with the requesting subsidiary.

In some embodiments, the subsidiary hierarchy may be implemented in the form of a tree-based data structure. In such embodiments, each corporate subsidiary in the subsidiary hierarchy corresponds to a node in the tree-based data structure. The subsidiary hierarchy identifies the functional currency of each subsidiary.

In some embodiments, the inventive system for consolidating multiple rate currencies associated with different corporate subsidiaries includes a manage consolidated rates module, a consolidated rate lookup module, and a currency conversion module. The manage consolidated rates module is configured to traverse a data structure representing a subsidiary hierarchy indicating a relationship between the different corporate subsidiaries. Each subsidiary in the subsidiary hierarchy comprises financial data in a functional currency. A requesting subsidiary is positioned higher in the subsidiary hierarchy than at least one other subsidiary. The consolidated rate lookup module is configured to receive a request for consolidated financial data at a user interface from the requesting subsidiary. The request indicates a perspective point of the requesting subsidiary relative to the other different corporate subsidiaries. The consolidated rate lookup module is further configured to, in response to the request, access an exchange rate between at least two related subsidiaries in the hierarchy. At least one of the related subsidiaries is the requesting subsidiary and the remainder of the related subsidiaries is positioned below the requesting subsidiary in the subsidiary hierarchy. The exchange rate is accessed from a consolidated rate store. The currency conversion module is configured to convert the financial data of each subsidiary in the hierarchy to the functional currency of a related subsidiary positioned higher in the hierarchy based on the corresponding exchange rate. The currency conversion module is configured to calculate the requested consolidated financial data based on the converted financial data for each subsidiary in the subsidiary hierarchy related to and positioned lower than the requesting subsidiary. The consolidated financial data is calculated in the functional currency associated with the requesting subsidiary.

In some embodiments, the inventive system further includes a spot currency rate store configured to store exchange rate data for converting a functional currency of one subsidiary in the subsidiary hierarchy to a different functional currency of any other subsidiary in the subsidiary hierarchy.

In some embodiments, the manage consolidated rates module is further configured to calculate a conversion rate between each pair of different subsidiaries in the subsidiary hierarchy using the exchange rate data and the functional currency associated with each subsidiary in the subsidiary hierarchy.

In some embodiments, the inventive system further includes a subsidiary metadata store configured to store the subsidiary hierarchy as data or as part of a data structure and to store information identifying the functional currency associated with each subsidiary in the subsidiary hierarchy.

In some embodiments, the inventive system further includes a subsidiary transaction detail store configured to store transaction data received from each subsidiary in the subsidiary hierarchy.

In some embodiments, the inventive system further includes a manage subsidiaries module for modifying the subsidiary hierarchy in response to user input. The manage subsidiaries module stores the unmodified version of the subsidiary hierarchy.

These and other advantages of the invention will be apparent to those of ordinary skill in the art by reference to the following detailed description and the accompanying drawings.

DETAILED DESCRIPTION OF THE INVENTION

Figure 1:
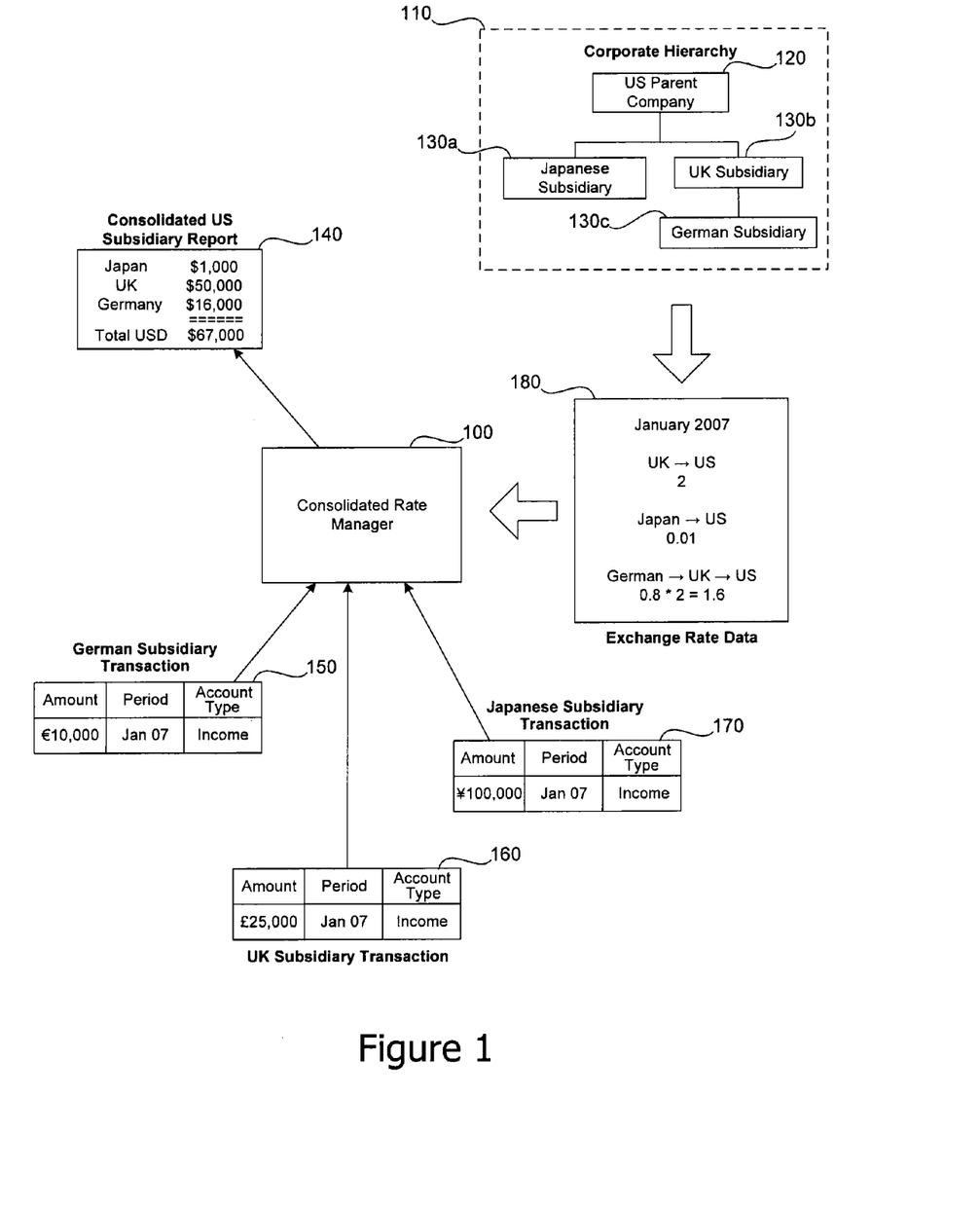
FIG. 1 is a block diagram of a system for consolidating multiple rate currencies associated with different corporate entities.

FIG. 1 is a block diagram of a system for consolidating multiple rate currencies associated with different corporate entities. The system includes an inter-subsidiary consolidated rate manager 100. A corporate hierarchy 110 is represented as a tree-based data structure that models a relationship of a parent company with several subsidiaries. In other words, data that describes the subsidiaries and the corresponding managing companies that are above the subsidiaries is stored in a hierarchical tree or similar data structure. For example, as shown in FIG. 1, a U.S. parent company 120 includes a Japanese subsidiary 130a and a U.K. subsidiary 130b. The U.K. subsidiary 130b further includes a German subsidiary 130c. It is noted that although a tree or similar hierarchical data structure is referred to in the description of the invention, other data structures may be used to implement embodiments of the invention without departing from the underlying concept. For example, multiple data structures may be used within the same time period, or may correspond to different time periods or different forms of data organization. In a time-based subsidiary hierarchy, a hierarchy is applicable for a specified time frame. In a version-based subsidiary hierarchy, different hierarchies may be used for the same time period.

Each subsidiary 130a, 130b, 130c enters and manages financial data in its functional currency. This is necessary both for functional reasons (i.e., Japanese subsidiary users do not want a functional currency of US dollars), as well as for local or regional financial reporting and tax compliance reasons. Thus, subsidiary financial reports can be generated within the context of a single subsidiary, in the functional currency of that subsidiary.

As an example, the U.S. parent company 120 may want to generate a consolidated U.S. subsidiary report 140 based on a German transaction 150, a UK transaction 160 and a Japanese transaction 170. The report 140 reflects the consolidated transaction total from the perspective of the U.S. company 120. Due to the corporate hierarchy 110, the results of the individual German, Japanese and U.K. transactions 150, 160, 170 require conversion before the consolidated U.S. subsidiary report 140 can be generated. In order for these transactions to be provided to the parent company 120 in U.S. dollar (USD) values, each transaction completed by one of the subsidiaries is reported to the consolidated rate manager 100.

The consolidated rate manager 100 also receives as an input exchange rate data 180 which includes all of the exchange rates between the different related subsidiaries in the corporate hierarchy 110. As shown in the figure, the conversion rate from £ to USD is 2 and the conversion rate from ¥ to USD is 0.01. However, in accordance with FASB 52 rules, the German transaction 150 is converted from € to £ and then to USD. Since the conversion rate from € to £ is 0.8, the conversion rate from € to USD is 1.6.

The consolidated rate manager 100 converts each transaction value at run time from the functional currency of the subsidiary to the functional currency of the parent company. Due to the corporate hierarchy 110, the conversion occurs through each intermediate subsidiary. For example, the consolidated rate manager 100 automatically converts the German transaction 150 from euros to U.K. pounds and then converts that value from U.K. pounds to USD, rather than converting directly from euros to USD. Based on FASB 52 rules, the consolidated transaction total from the perspective of the U.S. company 120 is $67,000.

The consolidated rate manager 100 is responsible for generating point to point (i.e., subsidiary to subsidiary) exchange rates for a given period and account type. Example account types include balance sheet, income and equity. The account type is used to determine one of three different categories of consolidation rates used for converting a value to a different currency.

The rate categories correspond to how the financial data is to be represented. In accordance with FASB 52 rules, the different rate categories include ending, average and historical. The ending rate category is an ending period spot rate used for most balance sheet accounts. The average rate category is a weighted average spot rate used for income accounts. The historical rate category is a point-in-time spot rate used for equity and some asset transactions. Thus, for every conversion between subsidiaries, three possible rate dimensions may be applicable. For example, in an income transaction, values are translated using the corresponding average rate for the applicable period, while an asset account would be translated using the ending or historical rate, depending on the nature of the asset.

Figure 2:
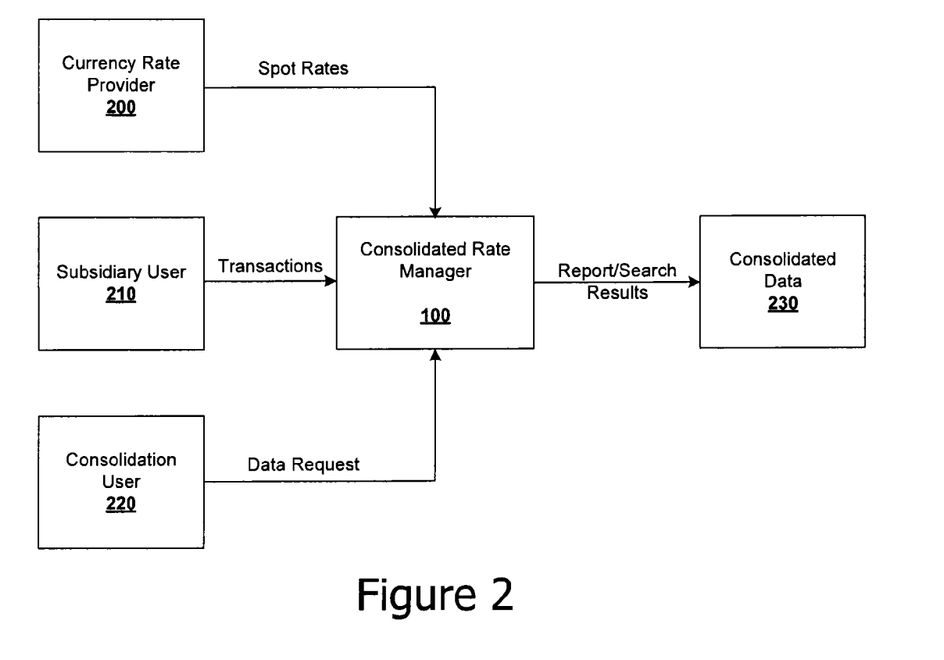
FIG. 2 is a block diagram showing a high level view of a system for consolidating multiple rate currencies associated with different corporate entities.

FIG. 2 is a block diagram showing a high level view of a system for consolidating multiple rate currencies associated with different subsidiaries. The consolidated rate manager 100 acquires and aggregates currency spot rates and applies them to the functional currencies represented by the subsidiary hierarchy. At run time, the consolidated rate manager 100 supplies spot rates that are specific to the accounting period, the rate type indicated by the transaction, and the different subsidiaries that are involved in the conversion.

Referring to the figure, the consolidation rate manager 100 receives three inputs. A currency rate provider 200 inputs point-to-point currency spot rates from various different international exchanges in real time. In one embodiment, the currency spot rates are provided daily. A subsidiary user 210 enters financial transaction data at the local subsidiary. The subsidiary user 210 is operating in a role, for example, as an employee of the subsidiary (e.g., sales or accounting personnel) or a bookkeeper. The consolidation system is transparent to the subsidiary user 210. A consolidation user 220 (e.g., CEO, manager of a mid-level subsidiary) enters a data request for a report, a search or any other kind of aggregate financial data. The data request is received from the consolidation user 220 at a user interface. The consolidation rate manager 100 then performs the translations (i.e., roll-up) on the transactions in real-time and presents the consolidated data 230 in a unified currency to the consolidation user 220.

The subsidiary hierarchy provides the consolidation user 220 with a context in which he is working. In some embodiments, the context may provide the data that the consolidation user 220 is looking at in terms of transactional or other financial data in a particular subsidiary. The context may also provide a perspective point from which the consolidation user 220 is looking at the data relative to the other subsidiaries in the subsidiary hierarchy. For example, an administrator or bookkeeper in the parent company at the top of the subsidiary hierarchy may be looking at transactional data at three levels below in the subsidiary hierarchy. The consolidated rate manager 100 adapts to the different scenarios and automatically figures out what lies in between the data the subsidiary user 220 is looking at and where that data is to be translated by traversing the subsidiary hierarchy.

The subsidiary hierarchy is traversed by resolving the parent-child relationships between the subsidiaries that represent the tree structure of the organization. In some embodiments, the subsidiary hierarchy is traversed at run-time. In other embodiments, the subsidiary hierarchy is traversed by pre-computing values between all child nodes and the intermediate parent nodes. The subsidiary-to-subsidiary rates are then stored for subsequent retrieval. By eliminating the requirement of traversing the subsidiary hierarchy at run-time, response time is improved by requiring only a constant lookup of the different exchange rates.

Figure 3:
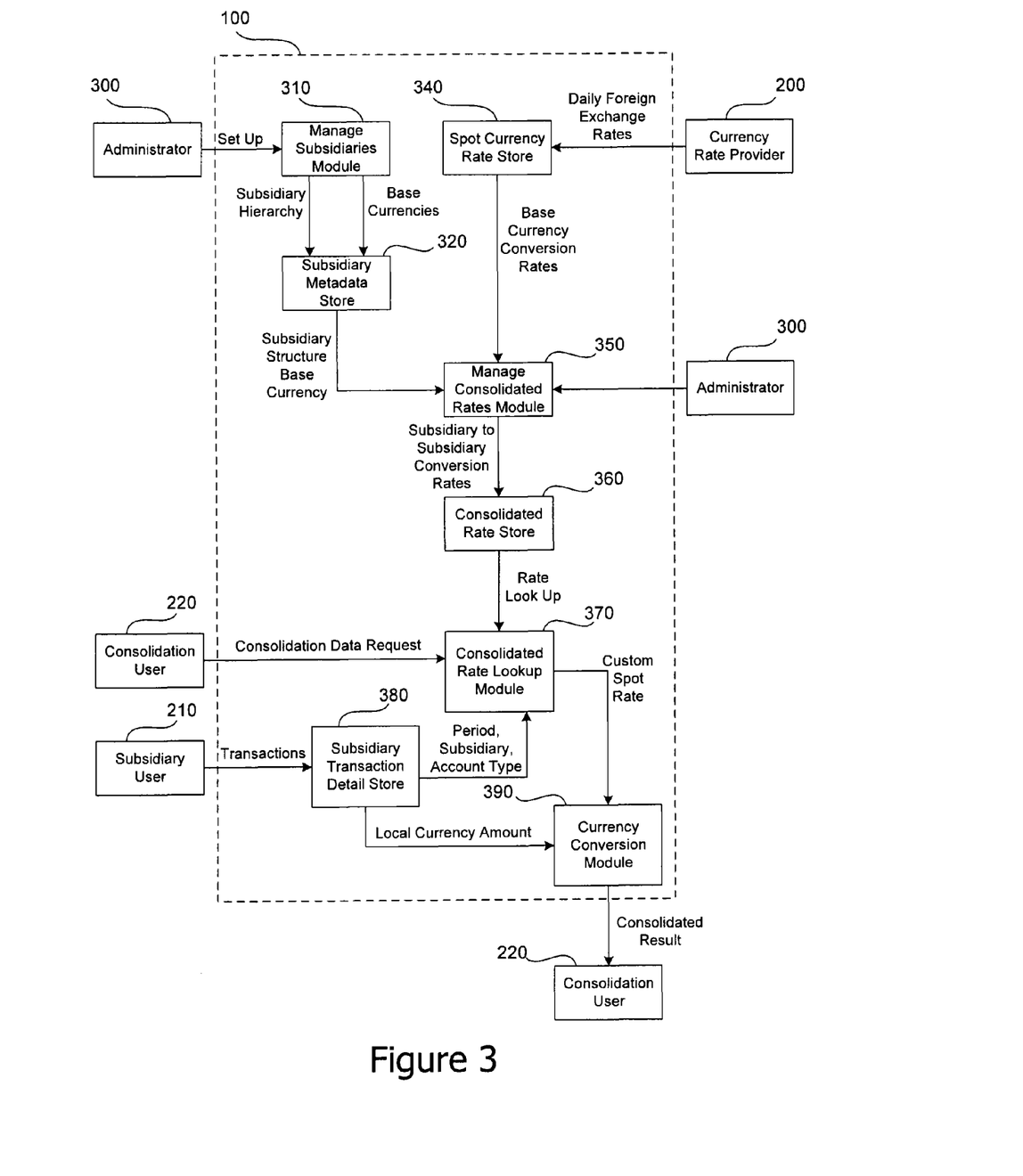
FIG. 3 is a block diagram showing a detailed view of a system for consolidating multiple rate currencies associated with different corporate entities.

FIG. 3 is a block diagram showing a detailed view of a system for consolidating multiple rate currencies associated with different subsidiaries. The figure shows modules for performing processes and independent stores of data. The consolidation system of the present invention may be implemented as a cached system such that much of the processing may be performed up-front or in advance to prepare data so that conversions may be performed more efficiently at run time.

An administrator 300 sets up the consolidation system using a manage subsidiaries module 310. The manage subsidiaries module 310 is a workflow that manages the metadata of the subsidiary hierarchy. The subsidiary hierarchy provides an application entry point that allows the administrator 300 to manage which subsidiaries roll up into which other subsidiaries. The subsidiary hierarchy also identifies the base currency in which each subsidiary operates. The administrator 300 may dynamically change the corporate structure by rearranging the subsidiary hierarchy. In accordance with some embodiments, the rate consolidation process is dynamically adapted in response to the changed subsidiary hierarchy. In other embodiments, the previous (i.e., unchanged) subsidiary hierarchy is preserved for a specific time period and/or may be maintained as a separate version of the subsidiary hierarchy. The subsidiary hierarchy and the base currencies for the subsidiaries are stored in a subsidiary metadata store 320.

As discussed above, the external currency rate provider 200 provides daily currency-to-currency foreign exchange rates to a spot currency rate store 340. The spot currency rate store 340 receives the exchange rates and makes any necessary conversions. For example, the spot currency rate store 340 may calculate conversion between the received exchange rates and the base currencies.

In response to input from the administrator 300, a manage consolidated rates module 350 calculates a conversion rate between different subsidiaries based on the base currency conversion rates from the spot currency rate store 340 and the subsidiary structure base currency from the subsidiary metadata store 320. The conversion rates between different subsidiaries are provided to a consolidated rate store 360.

The manage consolidated rates module 350 supports the automatic computation of the three rate types (ending, average and historical) depending on the type of financial data. When automatic computation is used, each rate is calculated appropriately. That is, the ending rate is set to the spot rate for each respective accounting period's end date; the average rate is set to a weighted average calculation of the transactions posting to each respective accounting period for the applicable account types (e.g. revenue) and currencies; and the historical rate is set to the weighted average calculation of the transactions posting to each respective accounting period for the applicable account type (e.g. equity) and currencies. Using the subsidiary hierarchy, different discrete relationships between the subsidiaries are determined and stored in the consolidated rate store 360 for easy access.

The manage consolidated rates module 350 records the point-to-point rates that are possible in the subsidiary hierarchy for a given accounting period. For example, for any given month, the manage consolidated rates module 350 generates ending, average and historical rates for the U.S. to Europe, the U.S. to Germany, the U.S. to Japan and any other point where the subsidiary user 210 may request consolidated data. The manage consolidated rates module 350 calculates rates based on the subsidiary hierarchy, the base currencies of the corresponding subsidiaries, and the spot rates from the spot currency rate store 340. The manage consolidated rates module 350 then stores the results in the consolidated rate store 360. The consolidated rate store 360 provides the rates to a consolidated rate lookup module 370 at run time.

In some embodiments, the manage consolidated rates module 350 performs the calculations by traversing the subsidiary hierarchy beginning from a bottom node and working up to the entry point or the perspective point of the subsidiary user 210. In order to perform the calculations at run time, all possible permutations are determined for each node in the subsidiary hierarchy. For example, in a three layer subsidiary hierarchy, calculations are performed from the third layer for all corresponding nodes. Thus, all rate-to-rate conversions are determined at each node in the subsidiary hierarchy. A factor is stored for each of the different historical, average and ending rate types. This allows for an efficient look up and data access at run time. For example, if the subsidiary user 210 is at the top of subsidiary hierarchy and is generating a consolidated balance sheet, the financial details for all of the subsidiary hierarchy would be required. The process is expedited by the previously determined and stored rate-to-rate conversions because the subsidiary hierarchy need not be traversed each time a line of an invoice requires a conversion to the appropriate currency.

The subsidiary user 210 enters financial transaction information which is stored in a subsidiary transactional detail store 380. As described in detail below, local currency subsidiary budgets and forecasts may also be stored in the subsidiary transactional detail store 380 for subsequent consolidation. The consolidation user 220 requests consolidation data and the request is provided to the consolidated rate lookup module 370 at run time. The subsidiary, the accounting period, and the account type for transactions associated with the consolidated data request are provided to the consolidated rate lookup module 370.

The pertinent subsidiaries are identified using the consolidated data request. The subsidiary from which the consolidation user 220 is operating is usually implicit by the user's session. However, in cases where the user has access to multiple subsidiaries, the subsidiary context is implied by the transaction or other data that is being managed. For instance, transactional data would be "owned" by a particular subsidiary due to where the transaction would be posted or based on which customer/vendor was the entity of record. The perspective of the consolidation user 220 is determined at run time when the request for the consolidated financial data is initiated. The perspective may be a determined from the user's session (e.g., a role that is restricted to a particular subsidiary), the perspective may be implied by the particular activity (e.g., a dashboard report that displays global consolidated metrics), or the perspective may be explicit (e.g., a financial report where the subsidiary context is explicitly chosen to run the report). The other subsidiary is identified from the consolidated data request. An applicable subsidiary-to-subsidiary conversion rate is provided to the consolidated rate lookup module 370 from the consolidated rate store 360.

The consolidated data request also includes information related to the accounting period. The transactional data uses the rate that is appropriate for the corresponding accounting period. Thus, each rate corresponds to a particular accounting period (e.g., a monthly based period). The date of the transaction determines which rate to use for the conversion.

The consolidated rate lookup module 370 calculates and provides the custom spot rate to a currency conversion module 390. The custom spot rate is a customized rate used for converting a value from its initial value (i.e., a functional currency of the subsidiary) to the consolidated value (i.e., a functional currency of a parent company) at run time. The currency conversion module 390 accesses the local currency from the subsidiary transactional detail store 380 and calculates the consolidated result using the custom rate value. The consolidated result is then provided to the consolidation user 220 in response to the consolidation data request.

In some embodiments, the consolidated rate manager 100 supports forecasting and budgeting for a future accounting period (e.g., an upcoming fiscal year). The consolidation user 220 may create the forecasts for the appropriate subsidiaries with the intent to maintain a stable budget. Since actual rates fluctuate throughout the year, the consolidation user 220 does not want to use fluctuating rates when generating the budget. The consolidated rate manager 100 supports a set of budget forecast rates to handle both real time rates as well as budget rates. Thus, both budget and actual reporting may be performed throughout the year. Assumptions from the beginning of the fiscal year may be maintained to evaluate the budget based on what was projected.

In one illustrative example, an account budget of one million pounds is entered in a U.K. subsidiary with an exchange rate of 1.5 with respect to USD such that the amount is converted to 1.5 million USD in the U.S. parent company. This value is evaluated over the course of the year such that the 1.5 million USD should remain substantially consistent. However, this figure may be higher or lower due to exchange rate variances. This discrepancy in the budget may be accounted for if it is known in advance that the discrepancy is due to the varying exchange rate. While the actual consolidated account value may fluctuate based on consolidated exchange rates, it is preferred that the consolidated budget value does not substantially fluctuate as the varying rates are received. Adjustments may be periodically made to the budget throughout the fiscal year based on the fluctuating rates. This allows for a determination about whether the budget targets were accurate. Thus, given a certain value for the exchange rates, the budget can be projected for other parts of the year.

Referring again to FIG. 3, the consolidated rate store 360 includes a set of rates that are constantly updated. The fiscal year begins with the current rates. For each period and for each account type, a second set of static rates is stored in the consolidated rate store 360. The second set of rates is controlled by the administrator 300. The administrator 300 may edit or change the rates, but the rates are not automatically computed and updated based on currency exchange rates. The rates may be a part of a fixed set which are subsequently used for projections. Variable rates may be used for current calculations. The lookup functionality is the same for both the static and variable rates. The difference is that the static rates are used for budget or forecasting values, whereas the varying rates are used for actual values. Thus, the subsidiary user 210 enters budget or forecasting values to the subsidiary transaction detail store 380. Reports may then be run on either the static or variable set of rates.

Established budget values may be run through the budget rates or the transactional rates. While assembling a budget vs. transaction report, the actual values may be run through the transactional rates to track finances or through the budget rates to determine budget accuracy. If there is a significant discrepancy in the budget with respect to the actual values, the actual values may be run through the budget rate to identify specific transactions or financial activities that may have caused the discrepancy. If the rate projections are substantially accurate, information may be provided regarding the accuracy of the budget. If the result is near the target budget but differs greatly when using the actual rates, a determination can be made regarding how much of the discrepancy is due to exchange rate variance.

The subsidiary transaction detail store 380 provides a separate data flow for foreign budget values and established forecasts that have a similar consolidated rate lookup value. In the context of a budget or forecast application, both the budget and the transactional detail that is being compared could optionally go through either of the rate lookups. This is controllable in the reporting application and is typically only available in the budgeting/forecasting area.

Figure 4:
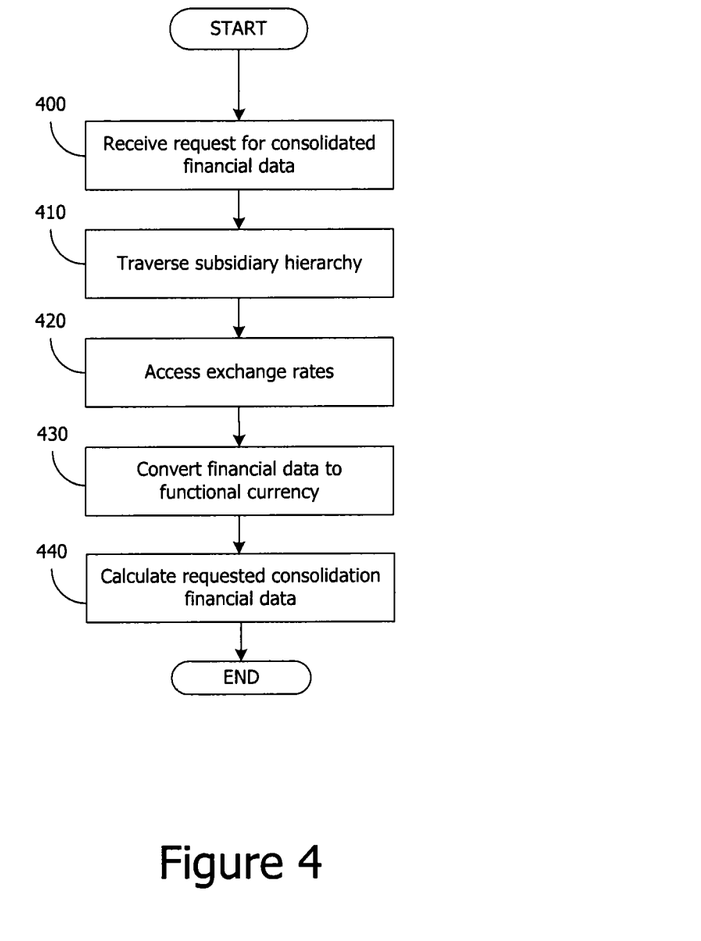
FIG. 4 is a data flow diagram illustrating a method for consolidating multiple rate currencies associated with different corporate entities.

FIG. 4 is a data flow diagram illustrating a method for consolidating multiple rate currencies associated with different corporate entities, in accordance with embodiments of the present invention.

As shown in the diagram, a request for consolidated financial data is received at a user interface from a requesting subsidiary (step 400). The request may include an identifier associated with the requesting subsidiary to identify the position of the requesting subsidiary in the subsidiary hierarchy or in a different version of the subsidiary hierarchy, an accounting period for the consolidated financial data and the account type for the transactions associated with the request. The requesting subsidiary may request any type of consolidated financial data such as a report of different subsidiary transactions conducted in different currencies. The request may also be associated with a search, a budget forecast or another type of request that requires aggregation of financial data between different subsidiaries operating in different functional currencies. The different currencies associated with each transaction require conversion before the financial data may be aggregated.

A subsidiary hierarchy indicating the relationship between the different subsidiaries is traversed (step 410). The subsidiary hierarchy may be represented as a tree-based data structure indicating a relationship of a parent company with several subsidiaries positioned below the parent company in the data structure. One having skill in the art would appreciate that other data representations or data structures are possible and may be implemented in embodiments of the present invention. Each subsidiary in the subsidiary hierarchy is associated with financial data in a functional currency. For example, an American subsidiary would be associated with a currency in U.S. dollars, and a U.K. subsidiary would be associated with currency in British pounds. The requesting subsidiary is positioned higher in the hierarchy than at least one other subsidiary in the hierarchy.

In response to the request, an exchange rate between at least two related subsidiaries in the hierarchy is accessed from a data store (step 420). At least one of the related subsidiaries is the requesting subsidiary and the other one or more of the related subsidiaries are positioned below the requesting subsidiary in the subsidiary hierarchy. All of the exchange rates between the different related subsidiaries in the hierarchy may be constantly updated (e.g., on a daily basis) such that the most current exchange rates are available for access. In some embodiments, the exchange rates may vary depending on, for example, the accounting period, the type of account and the rate category. In some embodiments, a second set of exchange rates between related subsidiaries is provided for requests associated with budget forecasting. Unlike the varying rates, the second set of exchange rates is static due to the nature of the requirements typical for budget forecasting. It is understood that the different applicable exchange rates for any pair of associated subsidiaries in the hierarchy are available for access.

The financial data of each subsidiary in the hierarchy is accessed and converted to the functional currency of a related subsidiary positioned higher in the hierarchy based on the corresponding exchange rate (step 430). The conversion is performed at run time through any intermediate subsidiaries in the hierarchy. For example, if one subsidiary is positioned below the parent company with two intermediate subsidiaries positioned there between and the parent company is the requesting subsidiary, the financial data would be converted three times (i.e., once at each of the two intermediate subsidiaries as well as once at the parent company.) Thus, three different conversion rates are required to convert the requested data to the functional currency of the requesting subsidiary.

The requested consolidated transaction data is calculated based on the converted transaction data for each subsidiary in the hierarchy related to and positioned lower than the requesting subsidiary (step 440). The consolidated financial data is calculated in the functional currency associated with the requesting subsidiary. The consolidated financial data may then be displayed to the requesting subsidiary. Processing then terminates.

Figure 5:
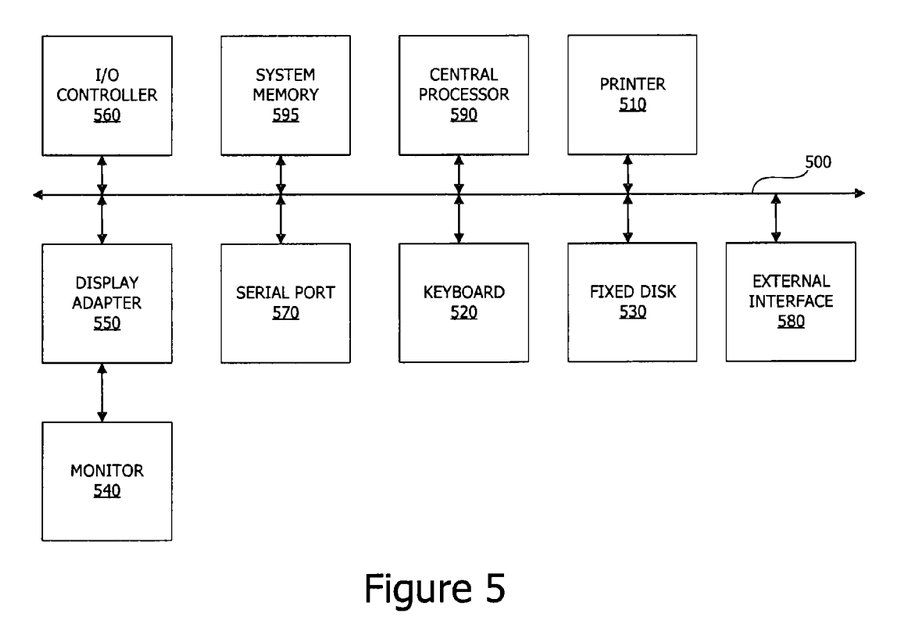
FIG. 5 shows typical components or subsystems of a computer apparatus in which embodiments of the present invention may be implemented.

FIG. 5 shows typical components or subsystems of a computer apparatus. The subsystems shown in FIG. 5 are interconnected via a system bus 500. Additional subsystems such as a printer 510, keyboard 520, fixed disk 530, monitor 540, which is coupled to display adapter 550, and others are shown. Peripherals and input/output (I/O) devices, which couple to I/O controller 560, can be connected to the computer system by any number of means known in the art, such as serial port 570. For example, serial port 570 or external interface 580 can be used to connect the computer apparatus to a wide area network such as the Internet, a mouse input device, or a scanner. The interconnection via system bus 500 allows the central processor 590 to communicate with each subsystem and to control the execution of instructions from system memory 595 or the fixed disk 530, as well as the exchange of information between subsystems. The system memory 595 and/or the fixed disk 530 may embody a computer readable medium.

As is apparent from the above description, a multiple currency rate consolidator in accordance with embodiments of the present invention addresses the needs of multinational companies that do business in different currencies and tax localities. A consolidated view of financial data may be provided in real time. The multiple currency rate consolidator allows each subsidiary within a subsidiary hierarchy to enter and manage transactional data as well as budget/forecast data in a corresponding localized functional currency. The multiple currency rate consolidator allows different consolidation levels to view localized, consolidated values of subsidiary transactions. The multiple currency rate consolidator also accommodates statutory, ad hoc and management reporting consolidation using different subsidiary configurations for the same time periods, as well as the versioning of the subsidiary hierarchy to accommodate structural changes across different time periods.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A computer-implemented method for consolidating financial data that was originally expressed in more than a single currency, comprising:
receiving a request for consolidated financial data from a requesting subsidiary of a plurality of subsidiaries, the plurality of subsidiaries arranged in a subsidiary hierarchy, with the subsidiary hierarchy indicating at least one relationship between one or more of the different subsidiaries of the plurality of subsidiaries;
operating an electronic processing element programmed with a set of computer-implementable instructions to traverse a data structure stored in an electronic data storage element representing the subsidiary hierarchy, wherein the data structure is a tree-based data structure and each of the plurality of subsidiaries corresponds to a node in the tree-based data structure, the data structure including identification of a functional currency for financial data associated with each node that is traversed;
in response to the request for consolidated financial data, accessing, from an electronic data store, at least one exchange rate between the identified functional currencies of at least one pair of subsidiaries in the traversed subsidiaries;
operating the electronic processing element to convert at least a portion of the financial data associated with each subsidiary of the traversed subsidiaries to the identified functional currency of a subsidiary positioned higher in the subsidiary hierarchy, wherein the conversion is based at least in part on the at least one exchange rate;
operating the electronic processing element to calculate the consolidated financial data based at least in part on the converted financial data associated with each subsidiary of the traversed subsidiaries, the consolidated financial data being calculated in the functional currency associated with the requesting subsidiary; and
consolidating the consolidated financial data and financial data that was originally expressed in more than a single currency into the data structure stored in an electronic data storage element representing the subsidiary hierarchy.

2. The method of claim 1, wherein the requesting subsidiary is higher in the subsidiary hierarchy than each of the other subsidiaries in the traversed subsidiaries.

3. The method of claim 2, wherein the subsidiary hierarchy comprises a corporate hierarchy of a corporation and the requesting subsidiary corresponds to a parent company of the corporation.

4. The method of claim 1, wherein the electronic data store containing the at least one exchange rate is updated with exchange rate data independent of the request for consolidated financial data.

5. The method of claim 1, wherein converting the at least a portion of the financial data associated with at least one subsidiary of the traversed subsidiaries to the identified functional currency of a subsidiary positioned higher in the subsidiary hierarchy comprises converting the at least a portion of the financial data to an identified functional currency of at least one subsidiary positioned intermediate between the at least one subsidiary and the subsidiary positioned higher in the subsidiary hierarchy.

6. The method of claim 1, further comprising, in response to the request for consolidated financial data, providing the consolidated financial data for presentation.

7. A system for consolidating financial data of a multinational company that does business in multiple localities, with one or more of the localities having a different functional currency, comprising:
one or more electronic processors;
an electronic data store storing at least subsidiary exchange rate data for a plurality of subsidiaries and a data structure representing a subsidiary hierarchy, the data structure being a tree-based data structure with each of the plurality of subsidiaries corresponding to a node in the data structure, wherein an entry of the data structure is configured at least to store a child node-parent node relationship, financial data and to identify a functional currency for a subsidiary;
an input mechanism communicatively coupled to the one or more electronic processors and enabling the one or more processors to at least receive a request from a user for consolidated financial data from a requesting subsidiary of the plurality of subsidiaries;
wherein the one or more electronic processors are coupled to the electronic data store and are programmed with a set of instructions, which when executed operate to:
traverse the subsidiary hierarchy data structure by pre-computing values between one or more child nodes and an intermediate parent node and storing subsidiary-to-subsidiary rates for subsequent retrieval; and in response to the request for consolidated financial data, operate to calculate the consolidated financial data by retrieving the stored subsidiary-to-subsidiary rates, the consolidated financial data being calculated in the functional currency identified with the requesting subsidiary based on the stored subsidiary exchange rate data and to consolidate the consolidated financial data and financial data into the tree-based data structure corresponding to each of the plurality of subsidiaries; and an output mechanism communicatively coupled with the one or more electronic processors and enabling the one or more processors to at least provide the calculated consolidated financial data to the user.

8. The system of claim 7, wherein the stored subsidiary exchange rate data comprises a plurality of exchange rates.

9. The system of claim 8, wherein each of the plurality of exchange rates corresponds to one of a plurality of exchange rate categories.

10. The system of claim 9, wherein the plurality of exchange rate categories includes at least one of an ending rate category, an average rate category and an historical rate category.

11. The system of claim 9, wherein each of the plurality of exchange rate categories corresponds to a different accounting period.

12. The system of claim 9, wherein each of the plurality of exchange rate categories corresponds to a different financial account type.

13. The system of claim 12, wherein the different financial account types include at least one of a balance sheet account type, an income account type and an equity account type.

14. A computer-implemented method for consolidating financial data of a multi-national company that does business in different currencies and tax localities, comprising:

accessing a data structure representing a subsidiary hierarchy from an electronic data store, wherein the data structure is a tree-based data structure and each of a plurality of subsidiaries of the multi-national company corresponds to a node in the data structure, and further wherein data associated with each subsidiary includes financial data and identifies a functional currency for the subsidiary;

accessing from the data store exchange rate data representing an exchange rate between a first subsidiary and a second subsidiary for one or more pairs of subsidiaries;

operating an electronic data processor to electronically compute a value of the financial data as measured at one or more child nodes in terms of the financial data as measured at an intermediate parent node based at least in part on applicable exchange rate data;

receiving a request from a user for consolidated financial data as determined from the perspective of a requesting subsidiary of the plurality of subsidiaries;

in response to receiving the request for consolidated financial data, electronically calculating the consolidated financial data by retrieving the applicable stored subsidiary-to-subsidiary exchange rates, wherein the consolidated financial data is calculated in the functional currency identified with the requesting subsidiary based on the accessed subsidiary exchange rate data;

consolidating the consolidated financial data and financial data that was originally expressed in more than a single currency into the data structure stored in an electronic data storage element representing the subsidiary hierarchy; and providing the calculated consolidated financial data and the financial data to the user.

15. The computer-implemented method of claim 14, wherein accessing data representing an exchange rate between a first subsidiary and a second subsidiary for one or more pairs of subsidiaries further comprises accessing a plurality of exchange rates.

16. The computer-implemented method of claim 15, wherein each of the plurality of exchange rates corresponds to one of a plurality of exchange rate categories.

17. The computer-implemented method of claim 16, wherein the plurality of exchange rate categories includes at least one of an ending rate category, an average rate category and an historical rate category.

18. The computer-implemented method of claim 16, wherein each of the plurality of exchange rate categories correspond to a different accounting period.

19. The computer-implemented method of claim 16, wherein each of the plurality of exchange rate categories correspond to a different financial account type.

20. The computer-implemented method of claim 19, wherein the different financial account types include at least one of a balance sheet account type, an income account type and an equity account type.

* * * * *